(12) United States Patent
Tarasinski

(10) Patent No.: US 6,619,257 B2
(45) Date of Patent: Sep. 16, 2003

(54) AUXILIARY DRIVE DETECTION SYSTEM AND METHOD

(75) Inventor: Nicolai Tarasinski, Frankenthal (DE)

(73) Assignee: Deere & Company, Moline, IL (US)

( * ) Notice: Subject to any disclaimer, the term of this patent is extended or adjusted under 35 U.S.C. 154(b) by 125 days.

(21) Appl. No.: 09/960,201

(22) Filed: Sep. 20, 2001

(65) Prior Publication Data

US 2002/0040702 A1 Apr. 11, 2002

(30) Foreign Application Priority Data

Oct. 7, 2000 (DE) .......................... 100 49 704

(51) Int. Cl.⁷ .............................................. F02D 41/00
(52) U.S. Cl. ...................................... 123/350; 477/107
(58) Field of Search .................... 123/350; 477/107, 477/108

(56) References Cited

U.S. PATENT DOCUMENTS

| | | | | |
|---|---|---|---|---|
| 5,706,199 A | * | 1/1998 | Wilson et al. ................. | 701/93 |
| 5,890,470 A | * | 4/1999 | Woon et al. ................. | 123/350 |
| 5,971,888 A | * | 10/1999 | Goode ......................... | 477/107 |
| 6,387,011 B1 | * | 5/2002 | Bellinger ...................... | 477/111 |
| 6,397,821 B1 | * | 6/2002 | Spagele et al. .............. | 123/486 |

\* cited by examiner

*Primary Examiner*—John Kwon

(57) ABSTRACT

A system and method for sensing and evaluating the rotation of the auxiliary drive of a utility vehicle is provided. The utility vehicle includes a main drive engine, a gearbox for the propulsion drive and at least one auxiliary drive to which an implement can be selectively connected. The power output of the main drive engine is branched to a first part to a propulsion drive and to a second part to the auxiliary drives. A rotation speed sensor senses rotation speed of the auxiliary drive and provides a speed signal to a control unit. The control unit determines the magnitude or amplitude of the second harmonic of the speed signal and transmits corresponding control signals when a predetermined threshold value is exceeded and/or is not reached. When the control unit determines that the second harmonic of the sensor signals exceeds the threshold value, it permits an increased power output of the main drive engine.

8 Claims, 2 Drawing Sheets

AUXILIARY DRIVE DETECTION SYSTEM AND METHOD

BACKGROUND OF THE INVENTION

The present invention relates to a system for sensing and evaluating the rotation of the auxiliary drive of a utility vehicle.

A self-propelled utility vehicle typically includes a main drive engine, a gearbox for the propulsion drive and an auxiliary drive to which an implement or assembly of appliances can be selectively connected. The power output of the main drive engine is branched into a first part for the propulsion drive and a second part for the auxiliary drives. A rotational speed sensor senses the rotation of the auxiliary drive.

With self-propelled utility vehicles with power take-off drive such as, for example, agricultural tractors, neither the drive-line driving the vehicle nor the power take-off shaft drive may be overloaded by the power output produced by the main drive engine. Therefore the engine power output is limited in such a way that an overload of the drive-line or of the power take-off shaft drive can occur neither for a pure propulsion drive nor for a pure power take-off shaft drive. However, if the main engine power output is applied simultaneously to the vehicle propulsion drive as well as to the power take-off shaft drive, so that a part of the power output is transmitted to the wheels and another part of the power output to the power take-off shaft, the engine power output can be increased further (power boost), without overloading the drive-line or the power take-off shaft drive.

For this purpose EP-A-0 901 928 proposes measurement arrangements for the determination of a power limiting value in the auxiliary drives and in the propulsion drive and to have the power output of the main drive engine conform to each of the power limiting values on the basis of the values so determined. The power limiting value is then detected as the torque of an auxiliary drive, a hydraulic pressure or the deflection of a control lever. However, the measurement of these values requires additional sensors and an increased measurement cost.

It is desirable to determine automatically and by simple means whether an auxiliary drive is connected to an assembly of appliances and is active. With such information, for example, the power output of the main drive engine can be controlled in a corresponding manner or other values applied.

SUMMARY

Accordingly, an object of this invention is to provide a system and method for determining automatically whether an implement or appliance is connected to an auxiliary drive by sensing and evaluating the rotation of an auxiliary drive.

This and other objects are achieved by the present invention, wherein a sensor senses rotation of an auxiliary drive and an evaluation unit determines the intensity of the second harmonic of the sensor signal and transmits corresponding control signals as a function of a pre-determined threshold value.

It has been found that an auxiliary drive, such as a power take-off shaft drive, performs torsional vibrations with characteristics harmonic vibrations, as long as an implement is connected to and driven by the auxiliary drive. A particularly prominent frequency of these torsional vibrations is twice as high as that corresponding to the basic number of revolutions of the auxiliary drive. If the auxiliary drive is operated without an attached implement this second order torsional vibration does not appear or does so only to a very weak degree. The invention monitors this second order vibration (second harmonic) and determines whether or not an implement is connected to the auxiliary drive. The system may actuate a warning light to indicate to the operator that a device is connected to the power take-off shaft.

When an attached implement is connected to and driven by the auxiliary drive, the auxiliary drive absorbs power. Due to the unavoidable friction losses in bearings and the like, at least an idling power loss is absorbed by the auxiliary drive, even if the attached implement is not operating but is merely carried along. This idling power loss can amount to 10% of the main drive engine power output.

The information whether or not an attached implement is connected to the auxiliary drive is utilized to increase the maximum permissible engine power output (power boost), as long as an attached implement is connected. The engine is normally operated at a maximum power output at which the drive line is not overloaded in pure propulsion operation. If the invention determines that an implement is connected, then the maximum power output of the main drive engine is automatically increased by, for example, 10%, by increasing the amount of fuel injected by the fuel injection pump by a corresponding amount.

The present invention senses only the presence of an attached implement, without regard to the actual power absorption of the implement. Thus, no pressure sensors, force sensors or torque sensors are required. Instead, an auxiliary drive rotational speed sensor signal, that is usually present anyway, can be utilized for the evaluation. Thus, fewer sensors are required than with other processes. No sensor calibrations are necessary. Existing drive-lines or auxiliary drives can be retrofitted by very simple means, without the need for extensive modifications. It is only necessary to evaluate the signal of an auxiliary drive sensor, that is already present, and this requires only the addition of a relatively simple program to the algorithm performed in the evaluation unit. The algorithm can be integrated into the electronic engine control and operates very efficiently with respect to power.

In order to avoid an overload of the auxiliary drive in case the vehicle is stationary and the drive-line does not absorb any power, a preferred further feature of the invention monitors the drive-line rotational speed or the vehicle speed. The engine power output can be increased beyond a normal maximum power limit (power boost) only if a minimum rotational speed of the drive-line or a minimum vehicle speed is exceeded.

Preferably, means are provided for the detection of the rotational speed of the auxiliary drive or the time interval (period) between successive sampling pulses. From the changes in the rotational speed or the change in the time intervals the amplitudes or the intensities of the particular rotational speed variation are calculated which have twice the frequency (second harmonic) of the basic rotational speed of the auxiliary drive. The determination of the intensity of the second harmonic is preferably performed by a narrow band filter, which filters the second harmonic from the sensor signal.

Preferably, the sensor signal is evaluated by an electronic data processing unit. This does not require any specially configured electric control circuits, but merely the programming of an evaluation unit. The determination of the magnitude of the second harmonic is most appropriately performed by a Fourier transform.

Preferably, the magnitude of the second harmonic is compared to a predetermined threshold value. When the threshold is exceeded a signal is transmitted to indicate that an implement or assembly of appliances is connected to the auxiliary drive. This indication can be performed visually or acoustically and, among other purposes, provide increased operating safety.

The utility vehicle includes a main drive engine, a gearbox for the propulsion drive and at least one auxiliary drive to which an implement can be selectively connected. The power output of the main drive engine is branched to a first part to the propulsion drive and to a second part to the auxiliary drives. At least one auxiliary drive sensor, for example, a rotational speed sensor, monitors the rotation of the auxiliary drive. An evaluation unit as described above, detects the second harmonic of the sensor signals and determines whether these exceed a predetermined threshold value. Preferably the auxiliary drive includes a power take-off shaft to which an implement can be connected by a universal joint, because it has been found that the second harmonic is particularly distinctive when a universal joint is connected with a slight angularity to the power take-off shaft drive.

DETAILED DESCRIPTION

Figure 1:
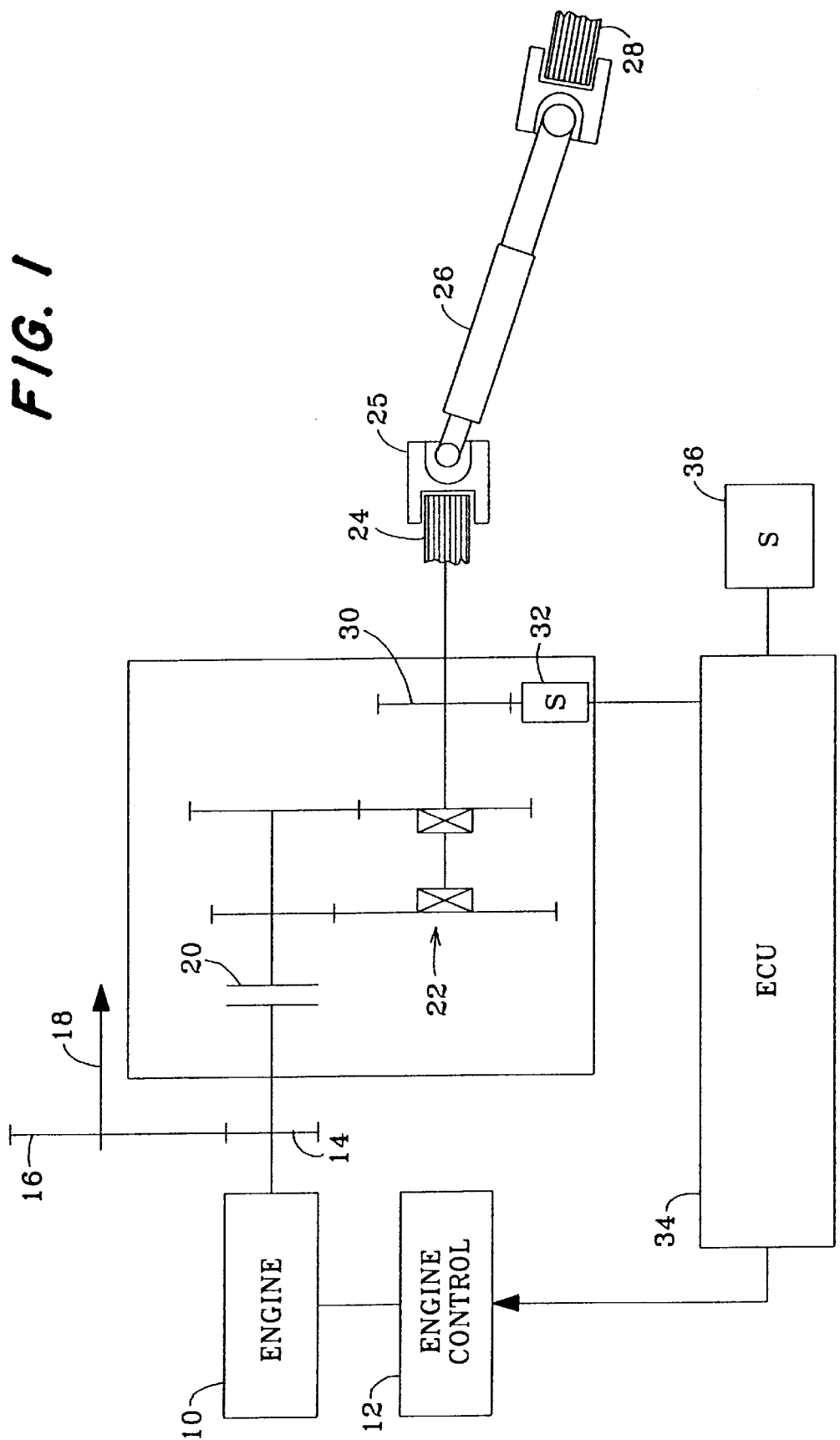
FIG. 1 is a schematic view of a vehicle drive with a power take-off shaft drive.

FIG. 1 shows an internal combustion engine 10 with an engine control 12 for a utility vehicle, for example, an agricultural tractor. The engine control 12 controls the fuel injection quantity for the fuel injection pump of the engine 10, not described in any further detail. The internal combustion engine 10 drives a wheels 14, 16 and a conventional drive-line 18, not described in any further detail, with gearbox components, differential and vehicle wheels driven by an axle (not shown).

The internal combustion engine 10 also drives a conventional power take-off shaft 24, used as an auxiliary drive, via a power take-off shaft clutch 20 and a shift gearbox 22. The power take-off shaft 24 is connected via a universal joint 25 to one end of an articulated shaft 26, whose other end is connected to the power take-off shaft 28 of a power take-off shaft implement, not described in any further detail. By actuating the power take-off shaft clutch 20 the power take-off shaft 24 can be shifted on and off. The shift gearbox 22 permits a shifting between two power take-off shaft rotational speeds.

A transmitter gear 30 is connected to the power take-off shaft 24, its outer circumference is provided with a set of gear teeth. Next to the set of gear teeth a magnetic rotational speed transmitter 32 is positioned, whose signals are evaluated by a control unit 34. Each time a tooth of the set of gear teeth moves past the rotational speed transmitter 32, the rotational speed transmitter 32 transmits an electric sampling pulse to the control unit 34.

From the time interval between successive sampling pulses the control unit 34 calculates the rotational speed or the length of the period of the transmitter gear 30 and the power take-off shaft 24. From the values detected the control unit 34 determines the magnitude of the change in the rotational speed or the change in the duration of the period (torsional vibration), which has twice the frequency as the basic rotational speed of the power take-off shaft. This can be performed, for example, by the application of a narrow band filter, by application of harmonic analysis or by a Fourier transform. The magnitude of the second harmonic so determined is compared to a predetermined threshold or limit value. If the magnitude exceeds the threshold value this indicates that an attached implement is connected to the power take-off shaft, otherwise no attached implement is connected. If the control unit 34 detects an attached implement it transmits a signal to the engine control unit 12 in order to permit an increased maximum power output of the engine.

Figure 2:
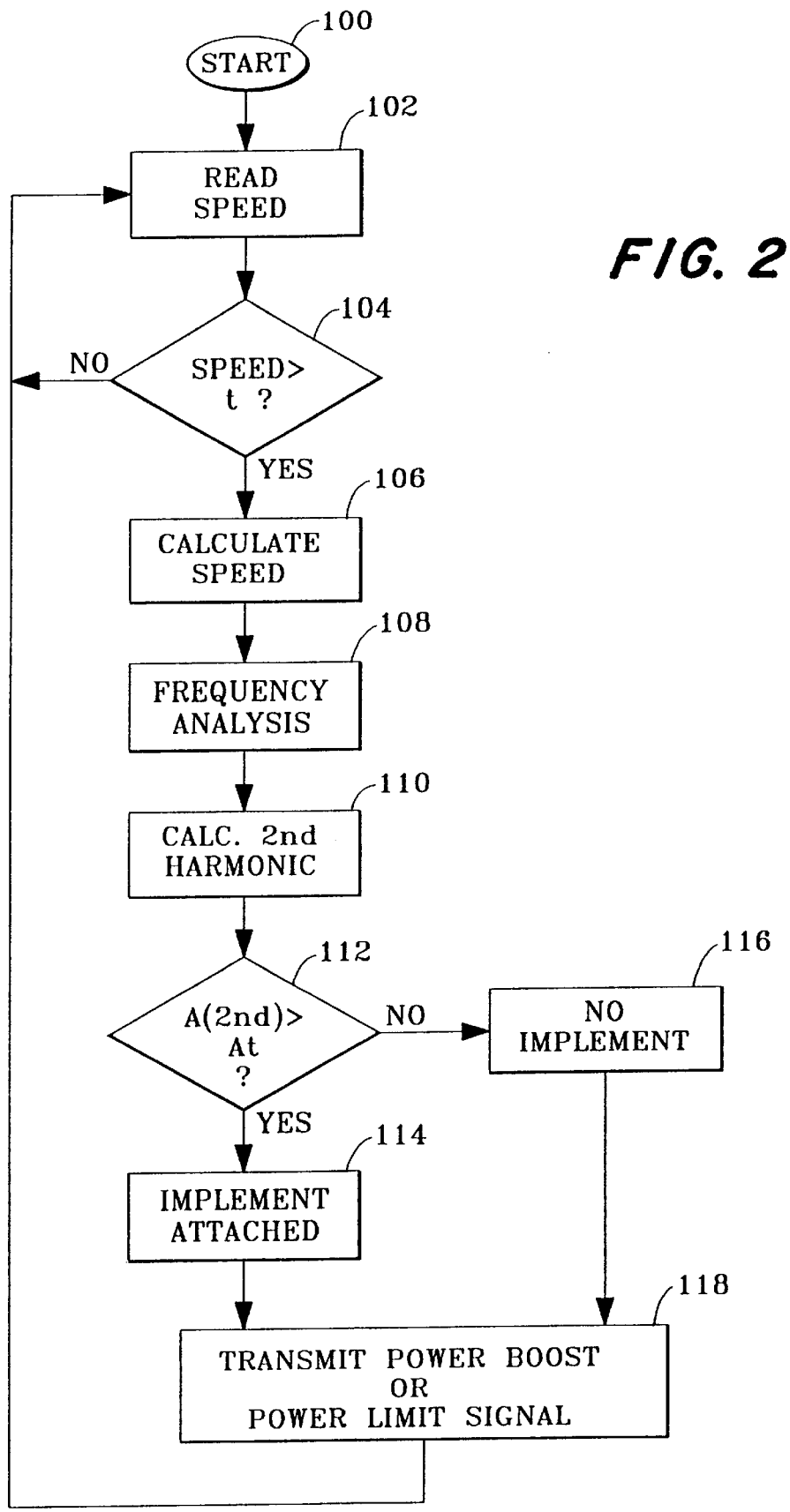
FIG. 2 is a logic flow diagram of a control algorithm according to the invention.

The control unit 34 executes an algorithm which is illustrated by the logic flow diagram of FIG. 2.

The algorithm is started with step 100. The start command can be initiated, for example, by the actuation of the ignition key, by actuation of a special switch or automatically upon engaging the power take-off shaft clutch 20 by a power take-off shaft clutch switch, not shown. In step 102 the sensed values of the rotational speed transmitter 32 and the vehicle speed sensor 36 are detected. The vehicle speed sensor 36 is arranged at an appropriate location in the drive-line 18 and transmits signals that are proportional to the operating speed of the vehicle.

Step 104 tests whether the vehicle speed has exceeded a predetermined limit value, St, for example, 2 km/h. If this is not the case the algorithm is returned to step 102. If the vehicle speed is above the limit value, then the algorithm continues to step 106, 108 and 110.

In step 106 the power take-off shaft rotational speed or the length of the period of the pulses of the rotational speed transmitter is calculated. The results are subjected to a frequency analysis in step 108. In step 110 the amplitude of the second harmonic wave is calculated.

Step 112 compares the value of the amplitude of the second harmonic, $A(2^{nd})$ with a threshold value, At. If the value of the amplitude is smaller than the threshold value, then step 114 determines that no attached implement has been recognized as connected to the power take-off shaft. Otherwise step 116 determines that an implement is attached.

From steps 114 and 116 the algorithm continues to step 118 in which a corresponding output is transmitted to the engine control unit 12 in order to increase the maximum allowable engine power output when an attached implement is connected, or to limit the engine power output to its normal maximum limit when the attached implement is missing. The algorithm is then returned to step 102.

The conversion of the above flow chart into a standard language for implementing the algorithm described by the flow chart in a digital computer or microprocessor, will be evident to one with ordinary skill in the art.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended

I claim:

1. A method for sensing and evaluating rotation of an auxiliary drive of a utility vehicle, the system having a speed sensor for generating a speed signal representing a rotation speed of the rotation of the auxiliary drive, the method comprising:

determining a magnitude of a second harmonic of the speed signal;

comparing the magnitude of a second harmonic to a predetermined threshold value;

transmitting a corresponding control signal as a function of the comparison;

detecting the rotational speed of the auxiliary drive or the time interval between successive sampling pulses; and calculating, from the changes in the rotational speed or changes in the time interval, an amplitude of a vibratory rotational speed which has a frequency equal to twice a frequency of a basic rotational speed of the auxiliary drive.

2. The method of claim 1, wherein:

the second harmonic is filtered out of the speed signal by a narrow band filter.

3. The method of claim 1 characterized by:

detecting the second harmonic with a Fourier transform.

4. The method of claim 1, characterized by:

when the magnitude of the second harmonic exceeds the threshold value, transmitting a signal which indicates that an implement is connected to the auxiliary drive.

5. The method of claim 1, wherein:

a universal joint couples the auxiliary drive to an implement.

6. A method for sensing and evaluating rotation of an auxiliary drive of a utility vehicle, the system having a speed sensor for generating a speed signal representing a rotation speed of the rotation of the auxiliary drive, the method comprising:

determining a magnitude of a second harmonic of the speed signal;

comparing the magnitude of a second harmonic to a predetermined threshold value;

transmitting a corresponding control signal as a function of the comparison; and when the magnitude of the second harmonic exceeds the threshold value, transmitting a control signal to a vehicle main drive engine control unit and increasing a maximum engine power output limit.

7. The method of claim 6, further comprising:

preventing an increase in the maximum engine power output limit unless a minimum rotation speed of the auxiliary drive is exceeded.

8. The method of claim 6, further comprising:

monitoring vehicle speed; and preventing an increase in the maximum engine power output limit unless a minimum vehicle speed is exceeded.

* * * * *